Nov. 19, 1935.  E. F. PAWSAT  2,021,805
CLOSURE FASTENER
Filed Nov. 11, 1933
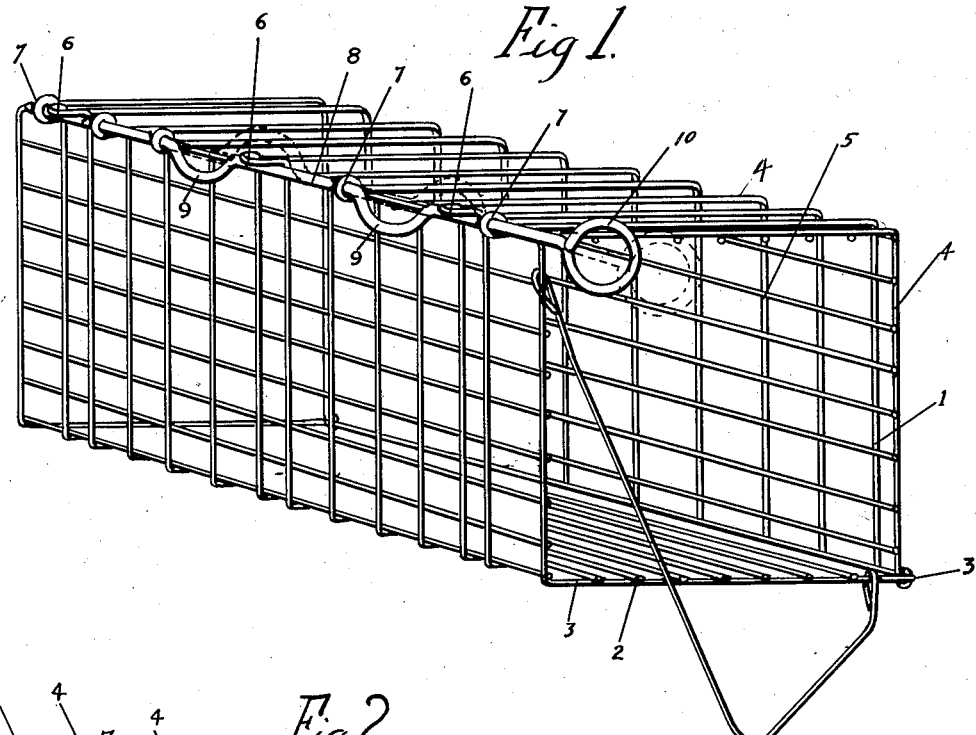
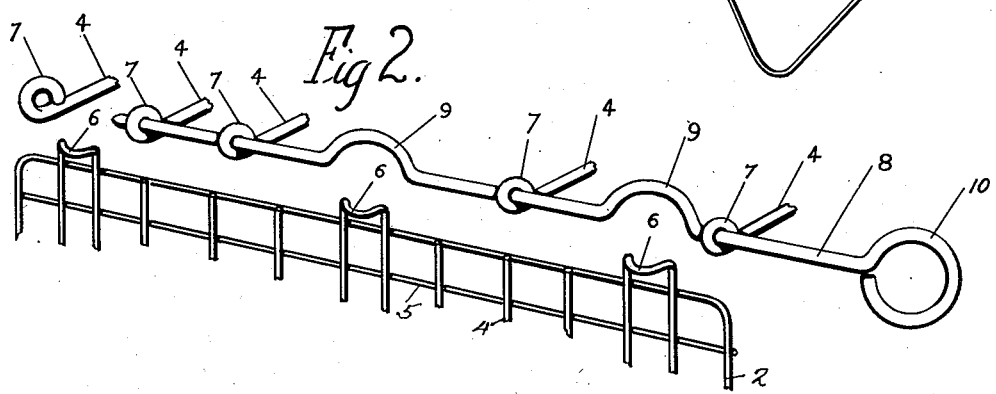
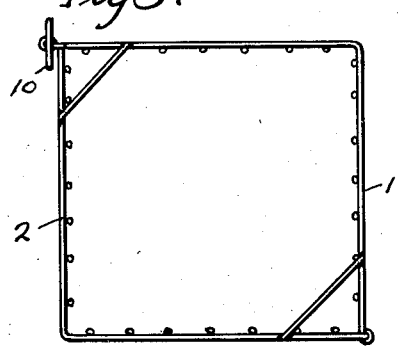
Inventor,
Ewald F. Pawsat
By Arthur N. Ewald
Attorney Patented Nov. 19, 1935

2,021,805

UNITED STATES PATENT OFFICE 2,021,805

CLOSURE FASTENER

Ewald F. Pawsat, Maysville, Ky., assignor to Wald Manufacturing Company, Incorporated, a corporation of Kentucky Application November 11, 1933, Serial No. 697,645

1 Claim. (Cl. 292—67)

My invention relates to molds of the type used for the smoking, cooking or other processing of sausages and other similar meat products.

The principal object of this invention is to provide a positive, simple and effective closure for a mold of the type mentioned. In the processing of meat products such as sausages, etc., it is found that a very positive closure for the mold holding the product during the operation is required to prevent its springing open during processing resulting in the loss of the contents. A further requirement of such closure is that it be simple and instantaneous in operation, as well as inexpensive in cost of construction. The present invention is arranged to fulfill these requirements and to provide a closure which is at all times available for instantaneous operation.

In the drawing:

Figure 1 is a perspective of a mold constructed in accordance with this invention.

Figure 2 is a perspective of the closure portion of said mold.

Figure 3 is an end view of a mold constructed in accordance with this invention.

The numerals 1 and 2 indicate respectively the two sections of which molds of this type are ordinarily constructed, said sections being loosely hinged together at 3. The sections are composed of cross right-angular shaped wires 4 and longitudinal wires 5 intersecting the right-angular wires, also in accordance with the usual practice. A number of the pairs of the cross wires 4 of section 2 are of unitary construction and doubled at the free end of the section to form a series of loop hooks 6 which extend outwardly from the free wall of the section as clearly shown in Figures 1 and 2 of the drawing. A series of the cross wires 4 of section 1 terminate in loops or eyes 7. Slidably mounted in the eyes 7 is a rod 8 which has offset bends 9. When the sections are in closed position as shown in Figure 1 of the drawing, the hooks 6 are adapted to engage the rod 8 except when by the sliding and turning of the rod in the eyes 7, as heretofore set forth, the offset bends 9 are positioned so as to afford clearance for the said hooks. The rod 8 is provided with an operating handle 10.

From the foregoing description the nature and use of the device will be apparent to those skilled in the art to which the same appertains.

When the sections are in closed position, as shown in Figure 1 of the drawing and the rod 8 is slid inwardly, the hooks 6 abut against straight portions of the rod and afford in connection with said rod interlocking and positive closure fastening means for the sections, of great rigidity. In order to open the section, the rod 8 is slid to the right so as to position the bends 9 opposite the hooks 6. The rod is then rotated so as to turn the bends around and above the hooks to the position shown in broken lines in Figure 1. The sections may then be swung open around the hinge 3. Interlocking is effected by the reverse operation, thus after the sections have been closed, the bends 9 are turned downwardly to the position shown in full lines in Figure 1, and the rod pushed inwardly, i. e., to the left, whereby the rod and hooks are brought into abutment with straight portions of the rod and the interlocking completed. It will be noted that while three hooks 6 are shown in the drawing the rod 8 contains but two bends 9; this is occasioned by the fact that the inner end of the rod, when the rod is in opening position, is arranged to clear the final hook as indicated in Figure 2. This, however, is a detail of construction, and the rod may be lengthened in which case a further bend of course would be required.

Having thus fully described my invention, what I claim as new and desire to secure by Letters Patent is:

A closure fastener for hinged sections comprising a series of eyes along the edge of one of said sections, a rod rotatably and slidably mounted in said eyes, said rod having a series of bends adapted to provide clearances for a series of keepers during rotation of said rod at one position of longitudinal adjustment thereof, and straight portions adapted to slide under said keepers to secure the sections together.

EWALD F. PAWSAT.